US012157212B2

(12) United States Patent
McCormick

(10) Patent No.: US 12,157,212 B2
(45) Date of Patent: Dec. 3, 2024

(54) HANDHELD CUTTING TOOL

(71) Applicant: McCormick Electrical Services, Inc.

(72) Inventor: Thomas E. McCormick, North Liberty, IN (US)

(73) Assignee: McCormick Electric Services, Inc., North Liberty, IN (US)

(*) Notice: Subject to any disclaimer, the term of this patent is extended or adjusted under 35 U.S.C. 154(b) by 295 days.

(21) Appl. No.: 17/812,054

(22) Filed: Jul. 12, 2022

(65) Prior Publication Data

US 2024/0017381 A1 Jan. 18, 2024

(51) Int. Cl.

| | |
|---|---|
| ***B25B 7/22*** | (2006.01) |
| ***B25B 7/02*** | (2006.01) |
| ***B25B 7/12*** | (2006.01) |

(52) U.S. Cl.

CPC .................. *B25B 7/22* (2013.01); *B25B 7/02* (2013.01); *B25B 7/123* (2013.01)

(58) Field of Classification Search

CPC .. B25B 7/02; B25B 7/22; B25B 7/123; B26B 17/003

USPC ...................................... 7/132; 81/421–426.5

See application file for complete search history.

(56) References Cited

U.S. PATENT DOCUMENTS

| | | | | | |
|---|---|---|---|---|---|
| 387,133 | A * | 7/1888 | Avery | B25B 7/22 | 7/132 |
| 1,464,807 | A * | 8/1923 | Clark | A61C 13/12 | 72/409.13 |
| 3,939,563 | A * | 2/1976 | Deike | B26F 1/36 | 30/361 |
| 4,136,589 | A * | 1/1979 | Kerr | B25B 7/02 | 81/426.5 |
| 5,301,532 | A * | 4/1994 | Bickmore | B25B 7/02 | 72/413 |

* cited by examiner

*Primary Examiner* — Hadi Shakeri

(74) *Attorney, Agent, or Firm* — BOTKIN & HALL, LLP; Michael D. Marston

(57) ABSTRACT

A hand tool including a first assembly including a first handle and a first jaw, a second assembly including a second handle pivotally connected to the first handle and a second jaw pivotally connected to the second handle, a link member, and a link adjustment member movably connected to the first handle. The link adjustment member is configured for engaging with and axially moving the first end of the link member for adjusting a force applied by the first jaw and the second jaw onto the element in the closed position. The hand tool further includes a cutting assembly including a cutting member connected to the second jaw. The cutting member is configured for cutting the element.

2 Claims, 4 Drawing Sheets

HANDHELD CUTTING TOOL

BACKGROUND OF THE INVENTION

The present disclosure relates to cutting tools and more specifically to a handheld pair of cutting pliers.

A nut cutter or splitter is used to remove a rusted nut from a bolt. It can be extremely difficult to remove a nut which is rusted, or otherwise stuck, onto a bolt. It may be impossible to remove the nut with a wrench. In such situations, it is customary to split the nut using a nut splitter or a hammer and chisel. A traditional nut splitter includes a clamp, typically an open c-frame, a cutting blade, and a mechanical tightener such as a screw for pressing the cutting blade into the nut. Therein, the cutting blade cuts into the outer surface of the nut and accordingly splits the nut apart.

A pair of pliers is a handheld tool for gripping onto a workpiece. Each pair of pliers usually includes a fixed member and a movable member that is pivotally connected to the fixed member. Each member includes a handle portion and a jaw portion. Some pliers also include a locking mechanism which selectively locks or fixes the movable member relative to the fixed member. Hence, the pliers will remain firmly locked in place without the continuous application of force by the user. In operation, the user squeezes the handles together so that a linkage member of the locking mechanism locks the pliers onto the workpiece. The gripping force applied by the jaws onto the workpiece may be adjusted by an adjustment screw located on the fixed handle. The adjustment screw engages with and axially slides the locking mechanism to change the force it applies to the jaws.

What is needed in the art is an improved handled pair of cutting pliers to more easily remove a rusted nut.

SUMMARY OF THE INVENTION

In one exemplary embodiment, there is provided a hand tool in the form of handheld and selectively lockable cutting pliers for cutting an element. The hand tool includes a fixed assembly that includes a fixed handle and a fixed jaw along with a movable assembly that includes a movable handle and a movable jaw. The hand tool also includes a force-application assembly that includes a link member and a link adjustment member. The link member has a first end that engages with and slides against the inside of the fixed handle and a second end that is pivotally connected to the movable handle. The link adjustment member is movably connected to the fixed handle. The link adjustment member engages with and axially moves the first end of the link member in order to adjust the force applied by the jaws onto the element. The hand tool also includes a cutting assembly for engaging with and splitting the element. The cutting assembly may be fixed or rotatable relative to the movable jaw.

In another exemplary embodiment, there is provided a hand tool. The hand tool includes a first assembly that includes a first handle and a first jaw connected to the first handle and a second assembly. The second assembly includes a second handle pivotally connected to the first handle. The second handle is movable relative to the first handle between an open position and a closed position. The second assembly also includes a second jaw having a proximal end and a distal end opposite the proximal end. The proximal end of the second jaw is pivotally connected to the second handle. The first jaw and the second jaw are configured for engaging with an element in the closed position. The hand tool also includes a link member which has a first end engaging with and axially movable relative to the first handle and a second end pivotally connected to the second handle. The hand tool also includes a link adjustment member which is movably connected to the first handle. The link adjustment member is configured for engaging with and axially moving the first end of the link member for adjusting a force applied by the first jaw and the second jaw onto the element in the closed position. The hand tool also includes a cutting assembly that includes a cutting member connected to the distal end of the second jaw. The cutting member is configured for cutting the element.

In another exemplary embodiment, there is provided a pair of locking pliers. The locking pliers includes a first assembly that includes a first handle and a first jaw connected to the first handle and a second assembly. The second assembly includes a second handle pivotally connected to the first handle. The second handle is movable relative to the first handle between an open position and a closed position. The second assembly also includes a second jaw having a proximal end and a distal end opposite the proximal end. The proximal end of the second jaw is pivotally connected to the second handle. The first jaw and the second jaw are configured for engaging with an element in the closed position. The locking pliers also includes a link member which has a first end engaging with and axially movable relative to the first handle and a second end pivotally connected to the second handle. The locking pliers also includes a link adjustment member which is movably connected to the first handle. The link adjustment member is configured for engaging with and axially moving the first end of the link member for adjusting a force applied by the first jaw and the second jaw onto the element in the closed position. The locking pliers also includes a cutting assembly that includes a cutting member connected to the distal end of the second jaw. The cutting member is configured for cutting the element.

One possible advantage of the handheld cutting tool is that a user may easily position and lock the jaws in place and subsequently apply a cutting force for easily cutting an element which would otherwise be difficult to remove.

Another possible advantage of the handheld cutting tool is that the cutting member may be easily rotated 360 degrees relative to the movable jaw, allowing the user to easily and efficiently select a desired cutting position of the cutting member.

BRIEF DESCRIPTION OF THE DRAWINGS

The embodiments illustrated herein are not limited to the precise arrangements, sequential steps, and dimensions shown. Like numerals indicate like elements throughout the drawings. In the drawings.

DETAILED DESCRIPTION

Figure 1:
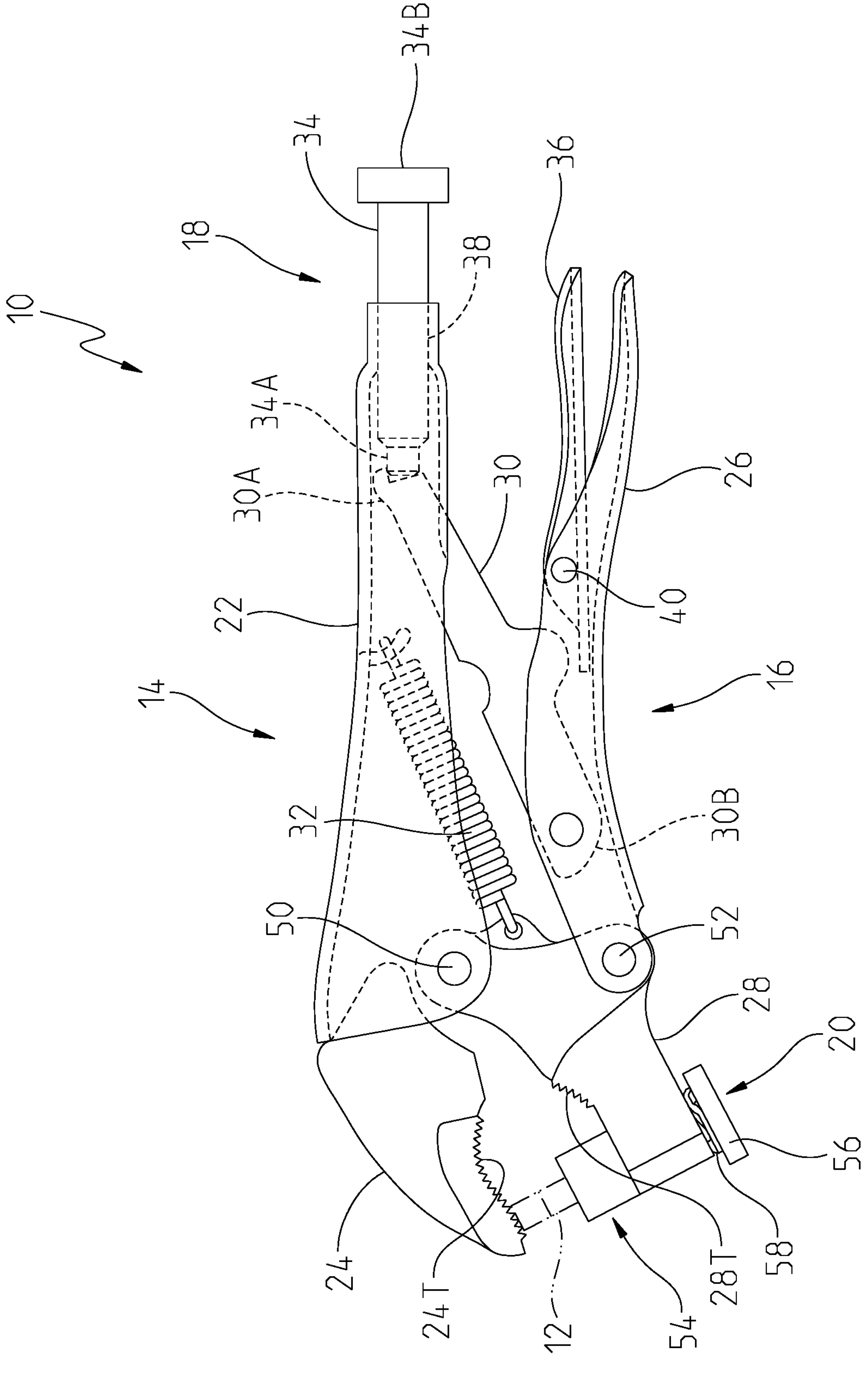
FIG. 1 illustrates a side view of the handheld cutting tool according to an exemplary embodiment of the present disclosure, the cutting tool including handles, a fixed jaw, a movable jaw, and a cutting assembly with a cutting member.

Referring now to the drawings, and more particularly to FIGS. 1-5, there is shown an embodiment of a hand cutting tool 10 in the form of handheld and selectively lockable cutting pliers. The cutting tool 10 can be positioned by the user in an open position and a closed position. As illustrated in FIG. 1, the cutting tool 10 is in the closed position for contacting and splitting, cutting, or otherwise breaking an element, such as a nut 12. The cutting tool 10 includes a first, fixed assembly 14 and a second, movable assembly 16 pivotally connected to the fixed assembly 14. The cutting tool 10 also includes a force-application assembly 18 and a cutting assembly 20 for engaging with and splitting the nut 12.

The fixed assembly 14 includes a first, fixed handle 22 and a first, fixed jaw 24 connected to the fixed handle 22. For instance, the fixed jaw 24 can be rigidly attached to or integrally formed with the fixed handle 22. As shown, the fixed jaw 24 is a separate component that is rigidly attached to the fixed handle 22 at proximal end the fixed jaw 24. The fixed handle 22 can be any desired handle and comprise any desired material, such as metal and/or plastic. The fixed jaw 24 can be in the form of any desired jaw design. As shown in FIG. 1, the fixed jaw 24 is a curved plier jaw with gripping features 24T, such as teeth, at its distal end. However, the fixed jaw 24 can be in the form of a C-shaped clamping arm. The fixed jaw 24 may comprise any desired material, such as metal, e.g., steel, and/or plastic.

The movable assembly 16 is pivotally coupled to the fixed assembly 14. The movable assembly 16 is located underneath the fixed assembly 14. The movable assembly 16 includes a second, movable handle 26 and a second, movable jaw 28 pivotally connected to the movable handle 26.

The movable handle 26 is movable relative to the fixed handle 22 between the open position and the closed position. The movable handle 26 may pivot relative to the fixed handle 22. The movable handle 26 can be in the form of any desired handle. The movable handle 26 may comprise any desired material. It should be anticipated that the handles 22, 26 may include grips to improve ergonomic comfort.

The force-application assembly 18 can be in the form of a dual locking and cutting force adjustment assembly. The force-application assembly 18 can be configured to lock the cutting tool 10 in a closed position and/or apply a variable cutting force to split the nut 12. Therein, the force-application assembly 18 can lock in the closed position, or otherwise retain, the cutting tool 10 in its partially closed position, wherein the fixed jaw 24 and cutting assembly engage with the nut 12. Additionally, or alternatively, the force-application assembly 18 may adjust the distance between and the force applied by the jaws 24, 28 onto the nut 12. Hence, if the grip of the user alone is not strong enough to split the nut 12, then the force-application assembly 18 can apply additional force to split the nut 12. The force-application assembly 18 includes one or more link members 30, a biasing member 32, a link adjustment member 34, and a release lever 36.

The link member 30 has a first end 30A and a second end 30B, as shown in phantom in FIG. 1. The first end 30A of the link member 30 engages with the fixed handle 22 and is axially movable, e.g., slidable, along the inside of the fixed handle 22. The second end 30B of the link member 30 is pivotally connected to the movable handle 26. The link member 30 may or may not have a protruding member for engaging with the release lever 36.

The biasing member 32 is connected between the fixed handle 22 and the movable jaw 28. For example, the biasing member 32 can be pivotally connected to the fixed handle 22 at one end and to the movable jaw 28 at its opposing end. The biasing member 32 can be in the form of a coil spring.

The link adjustment member 34 is movably connected to the end of the fixed handle 22. The link adjustment member 34 engages with and moves the link member 30. The link adjustment member 34 can be in the form of a threaded member, such as a screw with a knob, which is received within a corresponding threaded bore 38 in the distal end of the fixed handle 22. The link adjustment member 34 has a proximal end 34A and a distal end 34B. As the distal end 34B of the threaded member 34 is rotated, the proximal end 34A of the threaded member 34 engages with and slides the link member 30. Therein, the threaded member 34 changes the distance between the end of the link member 30 and the first pivot point (corresponding to the center of pin 52) of the movable jaw 28. In other words, the threaded member 34 rotates to move the link member 30 to adjust the force that the jaws 24, 28 exert on the nut 12 when the cutting tool 10 is in the closed position.

The release lever 36 is configured to release the cutting tool 10 from its closed position. The release lever 36 is pivotally connected to the movable handle 26 by a pivot pin 40 and is accordingly rotatable about a pivot point defined by the pivot pin 40. The release lever 36 may act against and move the link member 30 in order to unlock the handles 22, 26.

Figure 2:
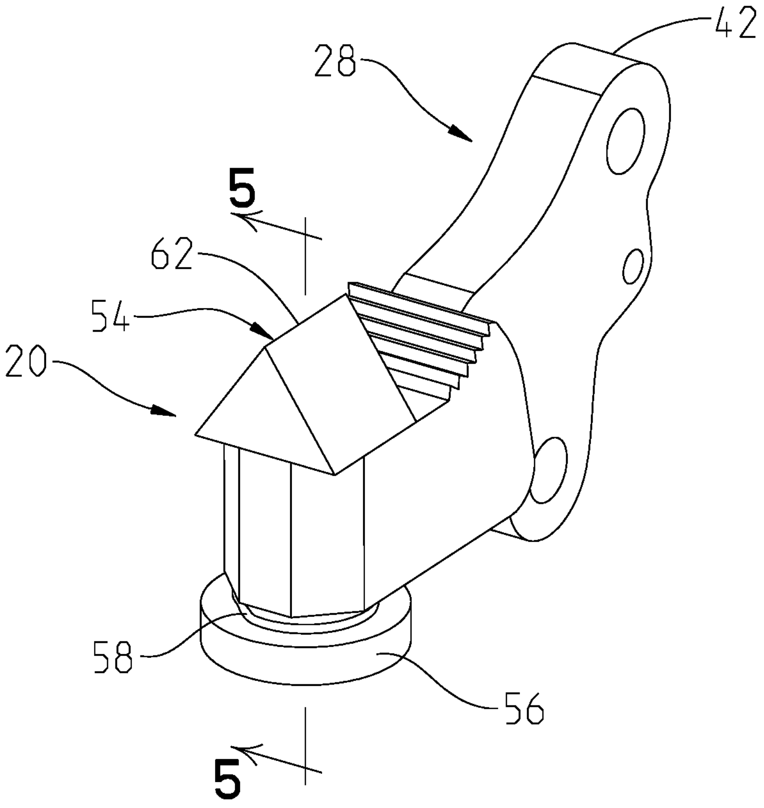
FIG. 2 illustrates a perspective view of the movable jaw, wherein the cutting member is in a first position.
Figure 3:
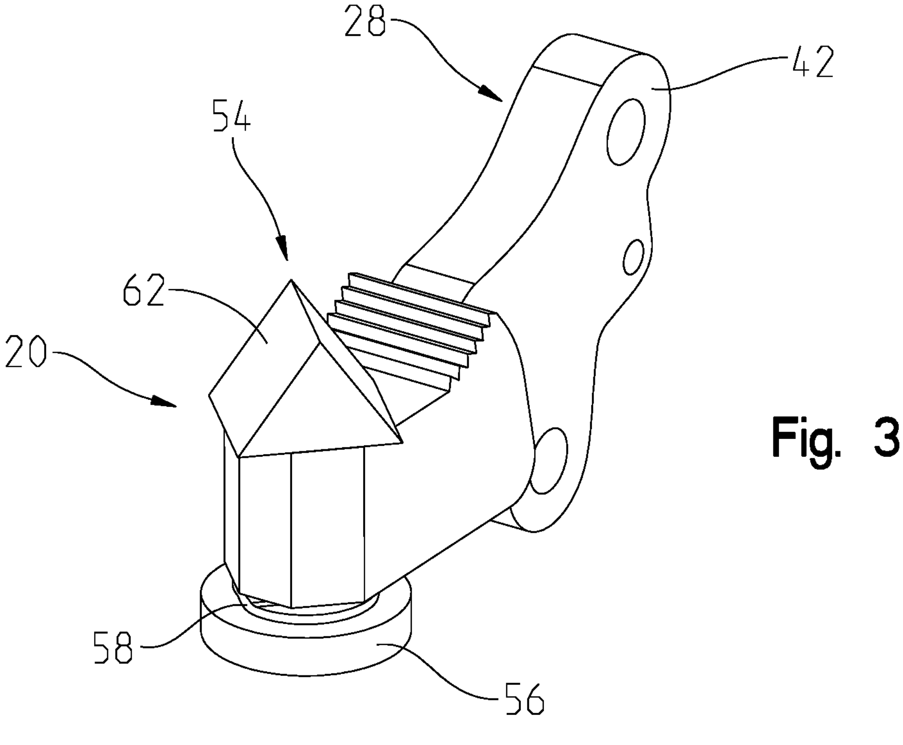
FIG. 3 illustrates another perspective view of the movable jaw, wherein the cutting member is in a second position.
Figure 4:
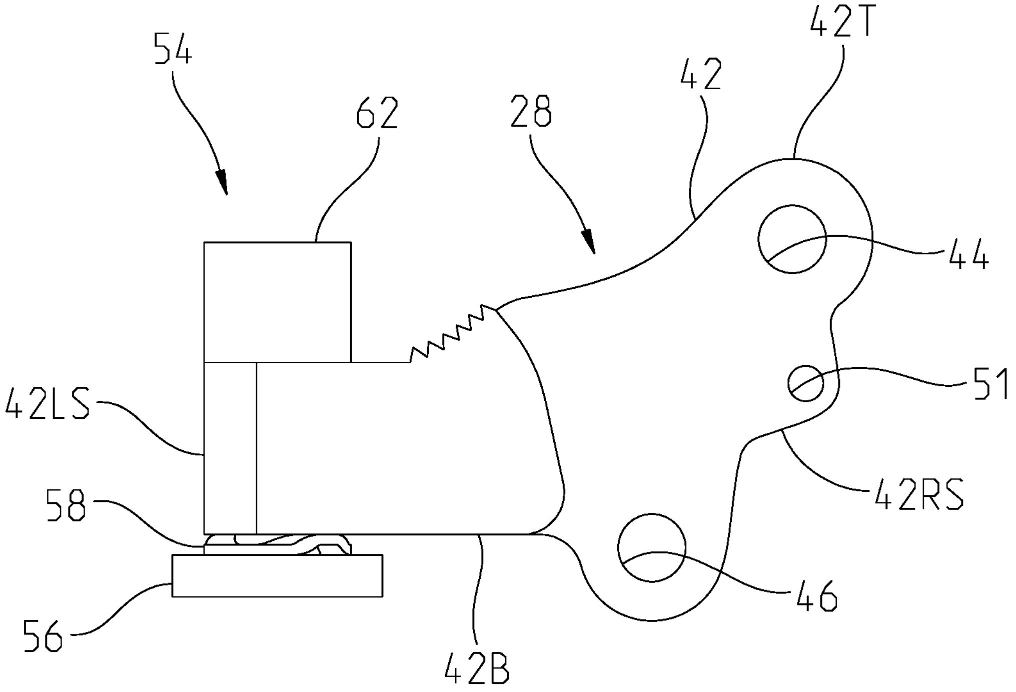
FIG. 4 illustrates a side view of the movable jaw and cutting assembly.

Referring now particularly to FIGS. 2-5, the movable jaw 28, at its proximal end, is pivotally connected to the fixed handle 22 and the movable handle 26. The movable jaw 28 includes a jaw body 42 or frame and the cutting assembly 20 which is connected to the jaw body 42 at its distal end (FIGS. 2-4). The movable jaw 28 may or may not have gripping features 28T, such as teeth located on the proximal end of the jaw body 42, rearwardly of the cutting assembly 20. In other words, the cutting assembly 20, at the distal end of the movable jaw 28, can be located in front of the teeth 28T.

Figure 5:
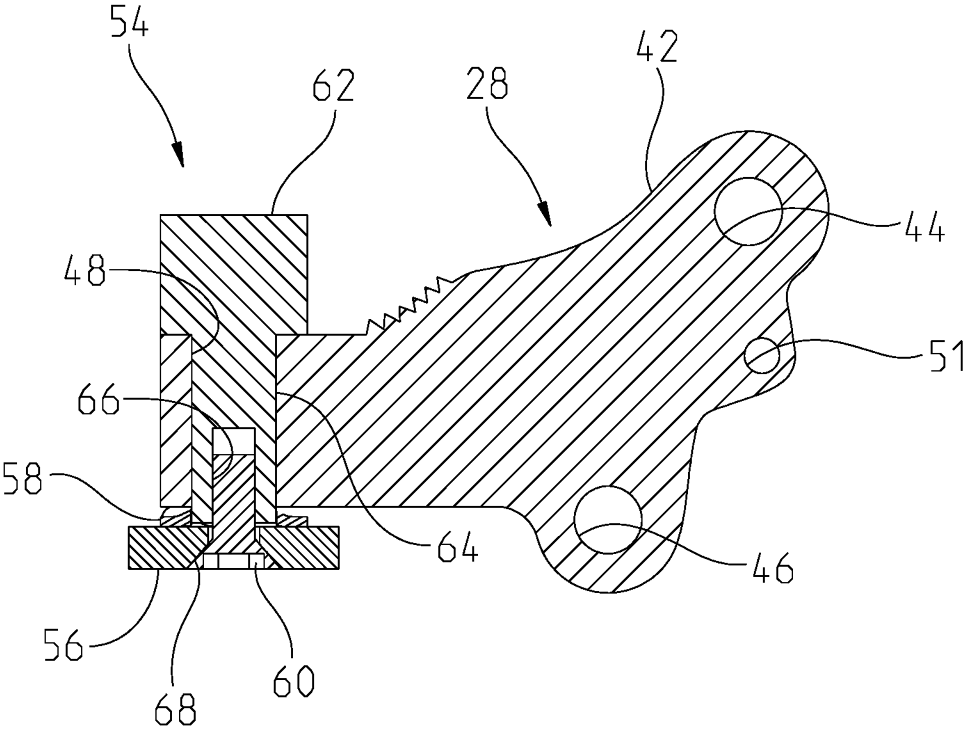
FIG. 5 illustrates a cross-sectional view of the movable jaw and cutting assembly, taken across line 5-5 of FIG. 2.

The jaw body 42 pivotally mounts the handles 22, 26 and the cutting assembly 20. The jaw body 42 has a top portion 42T, a bottom portion 42B, a left side, i.e., distal, portion 42LS, and an inwardly sloping right side, i.e., proximal, portion 42RS between the top and bottom portions 42T, 42B (FIG. 4). The jaw body 42 also has a first mounting bore 44 for mounting the fixed handle 22, a second mounting bore 46 for mounting the movable handle 26, a third mounting bore 48 for mounting the cutting assembly 20, and a fourth mounting bore 51 for mounting the biasing member 32 of the force-application assembly 18 (FIGS. 4-5). The first mounting bore 44 is located adjacent to the top portion 42T, the second mounting bore 46 is located adjacent to the bottom portion 42B, and the third mounting bore 48 is located adjacent to the left side portion 42LS. The second mounting bore 46 is thereby located underneath and in front of the first mounting bore 44. Each mounting bore 44, 46, 48 defines a respective pivot point and axis of rotation. The first and second mounting bores 44, 46 may receive a respective mounting pin 50, 52 therein for pivotally connecting the first and second handles 22, 26 to the movable jaw 28 (FIG. 1).

Therefore, the handles 22, 26, the movable jaw 28, and the link member 30 are connected by a compound-type pivot joint. As the handles 22, 26 articulate toward and away from one another, the handles 22, 26 move the movable jaw 28 between the open and closed positions, thereby increasing or decreasing the distance between the jaws 24, 28.

The cutting assembly 20 includes a cutting member 54 and a cutter adjustment member 56 for adjusting a position of the cutting member 54. The cutting assembly 20 may also include a biasing member 58 and a fastener 60 for attaching the cutter adjustment member 56 to the cutting member 54. The cutting assembly 20 is positionable in multiple different positions for engaging with the nut 12 at various angles in order for the user to more easily engage with and split the nut 12.

The cutting member 54 is connected to the distal end of the movable jaw 28. For instance, the cutting member 54 can be disposed within the bore 48 of the jaw body 42 of the movable jaw 28. The cutting member 54 can be movably connected to the jaw body 42 of the movable jaw 28, e.g., rotatable within the bore 48 thereof. The cutting member 54 may comprise a cutting head 62 and an elongated body 64 (FIG. 5). As shown, the cutting head 62 and the elongated body 64 are integrally formed with one another as a single member. However, it should be anticipated that the cutting head 62 and elongated body 64 may be separate components that are removably connected to one another. The cutting head 62 forms a cutting edge, and has a substantially rectangular cross-section. The cutting edge of the cutting head 62 is located above the teeth 28T of the movable jaw 28. In other words, the cutting head 62 extends above the teeth 28T of the movable jaw 28. In the closed position, without an element in between the jaws 24, 28, the cutting head 62 may contact the teeth 24T of the fixed jaw 24. It should be anticipated that the cutting head 62 and/or the teeth 28T of the movable jaw 28 may contact the teeth 24T of the fixed jaw 24. The elongated body 64 is substantially cylindrical and is configured to move within the bore 48 within the jaw body 42. The elongated body 64 includes a threaded bore 66 for receiving the fastener 60 therein. The cutting member 54 may comprise any desired material, such as metal.

The cutter adjustment member 56 is configured to move the cutting member 54 to adjust the position of the cutting head 62. The cutter adjustment member 56 is connected to the cutting member 54. For instance, the cutter adjustment member 56 may have a receiving hole 68 for receiving the fastener 60 wherein to secure the cutter adjustment member 56 to the cutting member 54 (FIG. 5). The receiving hole 68 may or may not be threaded to engage with the fastener 60. If the cutter adjustment member 56 does include a threaded receiving hole 68, then the cutter adjustment member 56 may be rigidly coupled with the cutting member 54 by way of the fastener 60. The cutter adjustment member 56 may be in the form of a knob. The knob may have any desired shape, such as circular, rectangular, or hexagonal. For instance, the cutter adjustment member may be in the form of an annular knob 56 with a hole 68 therein for receiving the fastener (FIG. 5). The knob may have gripping features around its periphery to enhance the user's grip thereupon.

The biasing member 58 of the cutting assembly 20 is positioned between the bottom of the jaw body 42 and the cutter adjustment member 56. The biasing member 58 may apply biasing forces onto the jaw body 42, cutter adjustment member 56, and/or cutting member 54. The biasing member 58 may apply sufficient biasing forces to rigidly couple the cutter adjustment member 56 and the cutting member 54 together so that the cutting member 54 may be repositioned upon rotating the cutter adjustment member 56. Also, the biasing member 58 may apply sufficient biasing forces onto the jaw body 42 and the cutter adjustment member 56 in order to rigidly fix the cutting member 54 relative to the jaw body 42, unless the user applies a greater amount of force via rotating the cutter adjustment member 56. As can be anticipated, the frictional forces between the cutting head 62 and the jaw body 42 may be enhanced by the biasing force of the biasing member 58. The biasing member 58 is shown as a washer, such as a wavy washer. However, the biasing member 58 may be in the form of another biasing member, such as a coil spring. As shown in FIG. 5, the washer 58 encircles the elongated body 64 of the cutting member 54, and the washer 58 is positioned between the jaw body 42 and the cutter adjustment member 56. The biasing member 58 may comprise any desired material, such as metal, plastic, and/or a polymer composite material.

The fastener 60 is connected to the cutting member 54 and the cutter adjustment member 56. The fastener 60 may comprise any desired fastener, such as a screw, a locking pin, or a tongue and groove connector. As shown, the fastener 60 is in the form of a screw 60. The screw 60 is disposed within the receiving hole 68 of the cutter adjustment member 56 and threaded into the receiving hole 66 of the cutting member 54.

In operation, the user may rotate the movable handle 26 and set the position of the jaws 24, 28 to grip the nut 12. Therein, the jaws 24, 28 can be engaged with the nut 12. For instance, the teeth of the fixed jaw 24 can contact the top of the nut 12 and the cutting member 54, connected to the distal end of the movable jaw 28, can contact the bottom of the nut 12. The teeth of the movable jaw 28 may also be used to engage with the nut 12, if desired. Then, the user may lock the jaws 24, 28 in place using the link adjustment member 34. Thereafter, or concurrently therewith, the user may further tighten the link adjustment member 34 to apply more force on the movable jaw 28 in order to split the nut 12. Before splitting the nut 12, the user may rotate the cutter adjustment member 56 to change the position of the cutting member 54. The cutter adjustment member 56 may be adjusted at any time before, during, and after the cutting process.

In an alternative embodiment, the cutting member 54 and the bores 44, 46, 48 of the jaw body 42 may each include one or more grooves and/or protrusions to thereby create two or more indexed positions of the cutting member 54. For instance, the elongated body of the cutting member 54 may have a rectangular or hexagonal cross-section and the bores 44, 46, 48 of the jaw body 42 may include grooves and/or protrusions. Additionally, for instance, the cutting member 54 may include a biased spring pin and the bores 44, 46, 48 of the jaw body 42 may include two or more corresponding receiving holes in the surface of the bores 44, 46, 48 for receiving the spring pin, or vice versa.

In an alternative embodiment, the cutter adjustment member and the fastener may be configured as a single component. For instance, the cutter adjustment member may be in the form of a threaded knob, which is threaded into the receiving hole of the cutting member 54.

Figure 6:
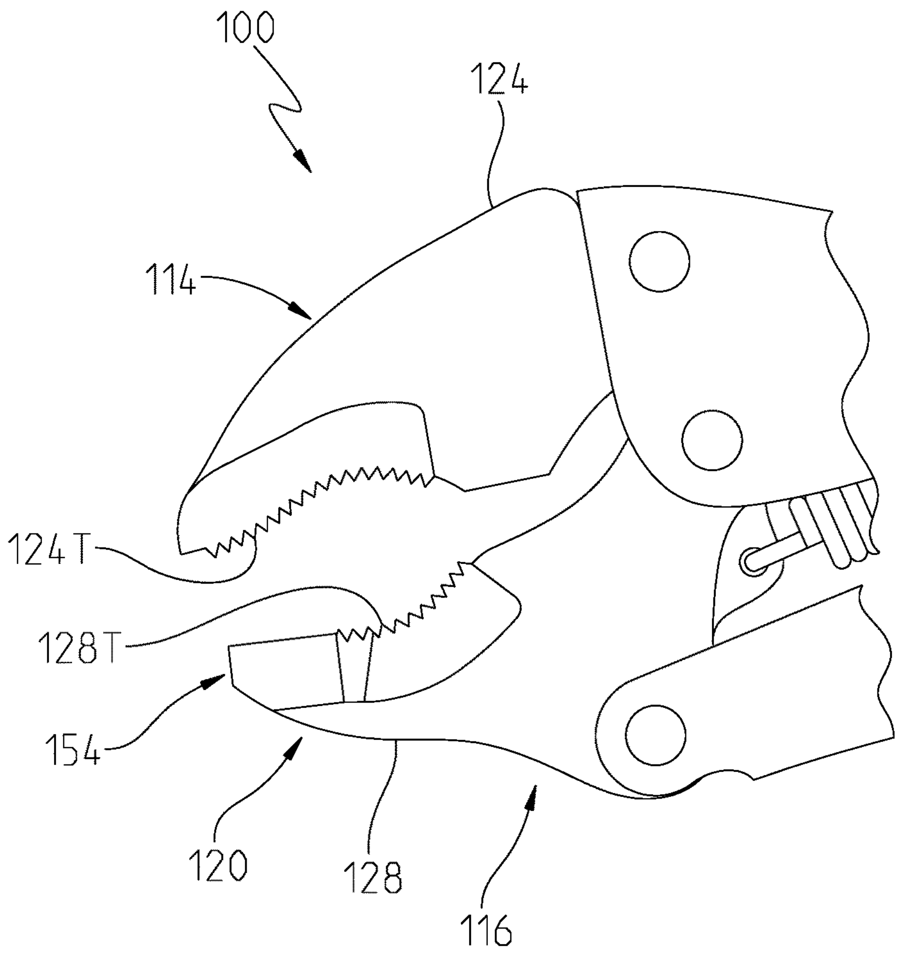
FIG. 6 is a side view of another embodiment of another cutting tool according to another exemplary embodiment of the present disclosure.
Figure 7:
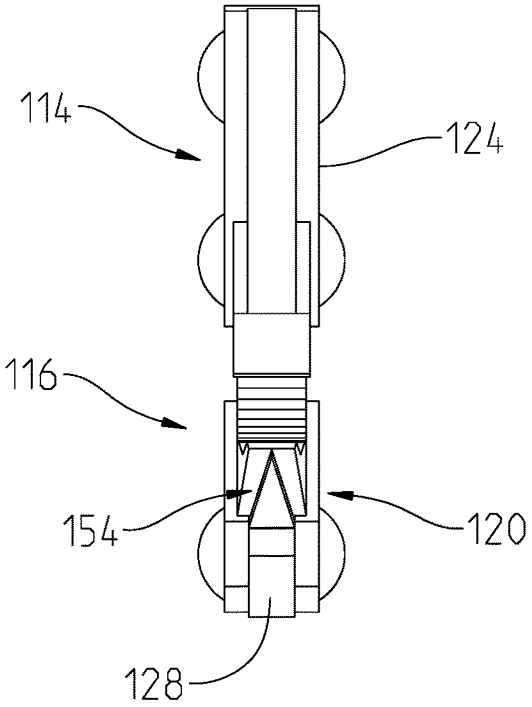
FIG. 7 is an end view of the cutting tool of FIG. 6.

Referring now to FIGS. 6-7, there is shown an alternative embodiment of a hand cutting tool 100 according to the present disclosure. The hand cutting tool 100 may be substantially similar to the cutting tool 10, except for the cutting assembly 20. This embodiment has a fixed assembly 114 having a fixed jaw and a movable assembly 116. The fixed jaw 124 is located opposite a movable jaw 128 may have a cutting assembly 120 that has a rigid, i.e., non-rotatable, cutting member 154. Teeth 128T may be located near a proximal end of the movable jaw 128 behind the cutting member. The cutting member 154 is located at the distal end of the movable jaw 128. There may also be teeth 124T on the fixed jaw 124 that will oppose the teeth 128T for gripping of objects near the distal end of the movable jaw 128. The rigid cutting member 154 is connected to the movable jaw 128. For instance, the rigid cutting member 154 may be integrally formed with the movable jaw 128. Like elements have been identified with like reference characters, except for the 100 series designation.

Other embodiments, which differ from the aforementioned embodiments, may be recognized by those skilled in the art without departing from the scope of the following claims.

What is claimed is:

1. A hand tool, comprising:

a first assembly comprising a first handle and a first jaw connected to the first handle;

a second assembly, comprising:

a second handle pivotally connected to the first handle, the second handle being movable relative to the first handle in between an open position and a closed position; and a second jaw having a proximal end and a distal end opposite the proximal end, the second jaw comprises a jaw body, the jaw body having a first mounting bore and a second mounting bore therein, wherein the jaw body has a top portion, a bottom portion, and an inwardly sloping side portion between the top portion and the bottom portion, wherein the first mounting bore is located adjacent to the top portion of the jaw body and the second mounting bore is located adjacent to the bottom portion of the jaw body, wherein the first handle is pivotally connected to the jaw body at a first pivot point defined by the first mounting bore in the jaw body, and the proximal end of the second jaw being pivotally connected to the second handle at said second mounting bore, the first jaw and the second jaw configured for engaging with an element in the closed position;

a link member having a first end engaging with and axially movable relative to the first handle and a second end pivotally connected to the second handle;

a cutting assembly comprising a cutting member connected to the distal end of the second jaw, a cutter adjustment member rotatably connected to the cutting member configured for adjusting and rotating the cutting member, and a biasing member connected between the second jaw and the cutter adjustment member, the biasing member configured for biasing the cutter adjustment member so that the cutting member is held in place by way of the biasing member, wherein the jaw body has a third mounting bore therein for receiving the cutting member, wherein the cutting member is disposed within the third mounting bore and rotatable relative to the second jaw, wherein the cutting member comprises a wedged-shaped cutting head and an elongated body connected to the wedged-shaped cutting head, wherein the cutter adjustment member is configured for being rotated by a user for rotating the cutting member and adjusting a position of the wedged-shaped cutting head relative to the jaw body; and wherein the cutting member is configured for cutting and splitting the element.

2. The locking pliers of claim 1, wherein the link adjustment member is movably connected to the first handle, the link adjustment member is configured for engaging with and axially moving the first end of the link member for adjusting a force applied by the first jaw and the second jaw onto the element in the closed position.

* * * * *